(12) United States Patent
Ha et al.

(10) Patent No.: US 7,903,670 B2
(45) Date of Patent: Mar. 8, 2011

(54) HOME NETWORK SYSTEM

(75) Inventors: Sam-Chul Ha, Changwon-Shi (KR); Seung-Myun Baek, Changwon-Shi (KR); Koon-Seok Lee, Changwon-Shi (KR); Yong-Tae Kim, Gimhae-Shi (KR)

(73) Assignee: LG Electronics Inc., Seoul (KR)

( * ) Notice: Subject to any disclaimer, the term of this patent is extended or adjusted under 35 U.S.C. 154(b) by 1058 days.

(21) Appl. No.: 10/558,434

(22) PCT Filed: May 14, 2004

(86) PCT No.: PCT/KR2004/001147
§ 371 (c)(1),
(2), (4) Date: Nov. 29, 2005

(87) PCT Pub. No.: WO2004/107088
PCT Pub. Date: Dec. 9, 2004

(65) Prior Publication Data
US 2006/0251086 A1   Nov. 9, 2006

(30) Foreign Application Priority Data

May 30, 2003 (KR) .................. 10-2003-0034962
Mar. 31, 2004 (KR) .................. 10-2004-0022184

(51) Int. Cl.
*H04L 12/56* (2006.01)
(52) U.S. Cl. ........................................ 370/401; 370/465
(58) Field of Classification Search ................. 370/401; 709/219, 250; 700/94
See application file for complete search history.

(56) References Cited

U.S. PATENT DOCUMENTS

| 4,888,728 A | 12/1989 | Shirakawa et al. |
| 4,928,245 A | 5/1990 | Moy et al. |

(Continued)

FOREIGN PATENT DOCUMENTS

CN   1199192   11/1998

(Continued)

OTHER PUBLICATIONS

Lee et al., "A New Control Protocol for Home Appliances—LnCP", Industrial Electronics, 2001 Proceedings, ISIE 2001, IEEE International Symposium, vol. 1, Jun. 12-16, 2001 pp. 286-291 vol. 1 (provided by Applicants and included in USPTO-1449, Nov. 29, 2005).*

(Continued)

*Primary Examiner* — Albert T Chou
(74) *Attorney, Agent, or Firm* — McKenna Long & Aldridge LLP

(57) ABSTRACT

The present invention discloses a home network using a living network control protocol. The home network system includes: a network based on a predetermined protocol; at least electric device connected to the network; and a network manager connected to the network, for controlling and/or monitoring the electric device, when the protocol includes an application layer for handling a message for controlling and monitoring the electric device, a network layer for network-connecting the electric device to the network manager, a data link layer for accessing shared transmission medium, and a physical layer for providing a physical interface between the electric device and the network manager, wherein the physical layer further includes a special protocol for providing an interface with a dependent transmission medium, and the network layer further includes a home code control sub-layer for managing a home code for network security when accessing the dependent transmission medium.

22 Claims, 7 Drawing Sheets

U.S. PATENT DOCUMENTS

| | | | |
|---|---|---|---|
| 4,980,913 A | 12/1990 | Skret | |
| 5,268,666 A | 12/1993 | Michel et al. | |
| 5,519,858 A | 5/1996 | Walton et al. | |
| 5,551,001 A | 8/1996 | Cohen et al. | |
| 5,794,037 A | 8/1998 | Young | |
| 5,808,885 A | 9/1998 | Dew et al. | |
| 5,835,723 A | 11/1998 | Andrews et al. | |
| 5,859,847 A | 1/1999 | Dew et al. | |
| 5,867,666 A | 2/1999 | Harvey | |
| 6,006,272 A | 12/1999 | Aravamudan et al. | |
| 6,058,106 A | 5/2000 | Cudak et al. | |
| 6,078,952 A | 6/2000 | Fielding et al. | |
| 6,105,093 A | 8/2000 | Rosner et al. | |
| 6,160,808 A | 12/2000 | Maurya | |
| 6,233,248 B1 | 5/2001 | Sautter et al. | |
| 6,258,169 B1 | 7/2001 | Asano | |
| 6,366,583 B2 | 4/2002 | Rowett et al. | |
| 6,415,313 B1 | 7/2002 | Yamada et al. | |
| 6,453,687 B2 | 9/2002 | Sharood et al. | |
| 6,507,953 B1 | 1/2003 | Horlander et al. | |
| 6,522,654 B1 | 2/2003 | Small | |
| 6,615,243 B1 | 9/2003 | Megeid et al. | |
| 6,618,764 B1 | 9/2003 | Shteyn | |
| 6,631,476 B1 | 10/2003 | Vandesteeg et al. | |
| 6,701,198 B1 | 3/2004 | Vandesteeg et al. | |
| 6,721,900 B1 | 4/2004 | Lenner et al. | |
| 6,731,201 B1 | 5/2004 | Bailey et al. | |
| 6,735,619 B1 | 5/2004 | Sawada | |
| 6,759,946 B2 | 7/2004 | Sahinoglu et al. | |
| 6,842,430 B1 | 1/2005 | Melnik | |
| 6,854,053 B2 | 2/2005 | Burkhardt et al. | |
| 6,856,999 B2 | 2/2005 | Flanagin et al. | |
| 6,891,850 B1 | 5/2005 | Vandesteeg et al. | |
| 6,909,891 B2 | 6/2005 | Yamashita et al. | |
| 6,915,444 B2 | 7/2005 | Vasko et al. | |
| 6,934,740 B1 | 8/2005 | Lawande et al. | |
| 6,982,960 B2 | 1/2006 | Lee et al. | |
| 6,987,462 B2 | 1/2006 | Bae et al. | |
| 7,028,312 B1 | 4/2006 | Merrick et al. | |
| 7,035,270 B2 | 4/2006 | Moore, Jr. et al. | |
| 7,058,722 B2 | 6/2006 | Ikami et al. | |
| 7,062,531 B2 | 6/2006 | Kim | |
| 7,069,091 B2 | 6/2006 | Williamson | |
| 7,103,834 B1 | 9/2006 | Humpleman et al. | |
| 7,107,358 B2 | 9/2006 | Vasko et al. | |
| 7,111,100 B2 | 9/2006 | Ellerbrock | |
| 7,149,792 B1 | 12/2006 | Hansen et al. | |
| 7,200,683 B1* | 4/2007 | Wang et al. | 709/250 |
| 7,257,104 B2 | 8/2007 | Shitama | |
| 7,287,062 B2 | 10/2007 | Im et al. | |
| 7,308,644 B2 | 12/2007 | Humpleman et al. | |
| 7,353,259 B1 | 4/2008 | Bakke et al. | |
| 7,389,332 B1 | 6/2008 | Muchow et al. | |
| 7,389,358 B1 | 6/2008 | Matthews et al. | |
| 7,403,994 B1 | 7/2008 | Vogl et al. | |
| 7,412,538 B1 | 8/2008 | Eytchison et al. | |
| 7,421,478 B1 | 9/2008 | Muchow | |
| 7,430,591 B2 | 9/2008 | Chamberlain | |
| 7,437,494 B2 | 10/2008 | Ellerbrock | |
| 7,454,517 B2 | 11/2008 | Ha et al. | |
| 7,461,164 B2 | 12/2008 | Edwards et al. | |
| 7,673,030 B2 | 3/2010 | Hite et al. | |
| 7,673,153 B1 | 3/2010 | Oishi et al. | |
| 2001/0025322 A1 | 9/2001 | Song et al. | |
| 2002/0011923 A1 | 1/2002 | Cunningham et al. | |
| 2002/0021465 A1 | 2/2002 | Moore et al. | |
| 2002/0026528 A1 | 2/2002 | Lo | |
| 2002/0035624 A1 | 3/2002 | Kim | |
| 2002/0038358 A1 | 3/2002 | Sweatt, III et al. | |
| 2002/0059617 A1 | 5/2002 | Terakado et al. | |
| 2002/0103898 A1 | 8/2002 | Moyer et al. | |
| 2002/0118696 A1 | 8/2002 | Suda | |
| 2002/0120763 A1 | 8/2002 | Miloushev et al. | |
| 2002/0165989 A1 | 11/2002 | Etoh | |
| 2002/0193144 A1 | 12/2002 | Belski et al. | |
| 2003/0009537 A1* | 1/2003 | Wang | 709/219 |
| 2003/0014630 A1 | 1/2003 | Spencer et al. | |
| 2003/0038730 A1 | 1/2003 | Imafuku et al. | |
| 2003/0051053 A1 | 3/2003 | Vasko et al. | |
| 2003/0051203 A1 | 3/2003 | Vasko et al. | |
| 2003/0053477 A1 | 3/2003 | Kim et al. | |
| 2003/0054809 A1 | 3/2003 | Bridges et al. | |
| 2003/0065824 A1 | 4/2003 | Kudo | |
| 2003/0067910 A1 | 4/2003 | Razazian et al. | |
| 2003/0079000 A1 | 4/2003 | Chamberlain | |
| 2003/0079001 A1 | 4/2003 | Chamberlain | |
| 2003/0083758 A1 | 5/2003 | Williamson | |
| 2003/0085795 A1 | 5/2003 | An | |
| 2003/0088703 A1 | 5/2003 | Kim | |
| 2003/0158956 A1 | 8/2003 | Tanaka et al. | |
| 2003/0165142 A1 | 9/2003 | Mills et al. | |
| 2004/0042487 A1 | 3/2004 | Ossman | |
| 2004/0047298 A1 | 3/2004 | Yook et al. | |
| 2004/0064578 A1 | 4/2004 | Boucher et al. | |
| 2004/0088731 A1 | 5/2004 | Putterman et al. | |
| 2004/0111490 A1 | 6/2004 | Im et al. | |
| 2004/0158333 A1 | 8/2004 | Ha et al. | |
| 2004/0184456 A1 | 9/2004 | Binding et al. | |
| 2004/0205309 A1 | 10/2004 | Watanabe | |
| 2005/0108568 A1 | 5/2005 | Bussiere et al. | |
| 2005/0190727 A1 | 9/2005 | Vanlieshout et al. | |
| 2006/0047677 A1 | 3/2006 | Lin et al. | |
| 2006/0248518 A1 | 11/2006 | Kundert | |
| 2006/0271709 A1 | 11/2006 | Vasko et al. | |
| 2007/0019615 A1 | 1/2007 | Baek et al. | |
| 2007/0025368 A1 | 2/2007 | Ha et al. | |
| 2008/0097631 A1 | 4/2008 | Baek et al. | |
| 2008/0222325 A1 | 9/2008 | Ishino et al. | |
| 2008/0255692 A1* | 10/2008 | Hofrichter et al. | 700/94 |
| 2008/0259786 A1 | 10/2008 | Gonda | |

FOREIGN PATENT DOCUMENTS

| | | |
|---|---|---|
| CN | 1398469 | 2/2003 |
| EP | 1115263 A1 | 7/2001 |
| EP | 1 202 493 | 5/2002 |
| JP | 60-112336 | 6/1985 |
| JP | 61-216543 | 9/1986 |
| JP | 10308335 | 11/1998 |
| JP | 2002-325079 | 11/2002 |
| KR | 10-2001-93265 A | 10/2001 |
| KR | 10-2002-0064847 | 8/2002 |
| KR | 10-2003-0040766 | 5/2003 |
| WO | WO 01/37581 A2 | 5/2001 |
| WO | WO 01/80030 | 10/2001 |
| WO | WO 02/097555 | 12/2002 |

OTHER PUBLICATIONS

Wang et al., "Towards Dependable Home Networking: An Experience Report" by Wang et al., Proceedings International Conference on Dependable Systems and Network, 2000, DSN 200025, IEEE Computer Society, pp. 43-48 (provided by Applicants and included in USPTO-1449, Nov. 29, 2005).*

Kim, Seungcheon, et al., "Home Networking Digital TV Based on LnCP", IEEE Transactions on Consumer Electronics, vol. 48, No. 4 (2000), pp. 990-996.

Lee, Koon-Seok, et al. "A New Control Protocol for Home Appliances—LnCP", Digital Appliance Company Research Lab., Pusan, Korea, IEEE (2001), pp. 286-291.

Koon-Seok Lee, et al., "Network Configuration Technique for Home Appliances based on LnCP," 2003 IEEE, pp. 367-374.

Simon Baatz, et al., "Handoff Support for Mobility with IP over Bluetooth," Univ. of Bonn, Inst. of Computer Science IV, (2000 IEEE), pp. 143-154.

Koon-Seok Lee, et al., "A New Control Protocol for Home Appliances—LnCP," In: International Symposium on Industrial Electronics, 2001, Proceedings, ISIE 2001, Jun. 12-16, 2001, pp. 286-291.

Yi-Min Wang, et al, "Towards Dependable Home Networking: An Experience Report," In: Proceedings International Conference on Dependable Systems and Networks, 2000, DSN 200025, Jun. 28, 2000, Los Alamitos, CA, USA, IEEE Computer Society, pp. 43-48.

Lee et al., "A New Home Network Protocol for Controlling and Monitoring Home Appliances—HNCP", IEEE, 2002, p. 312-313.

Hwang et al., "ATM-based plug-and-play technique for in-home networking", Electronics Letters, vol. 34, No. 22, pp. 2088-2090, 1998.

Manner et al., "Evaluation of Mobility and quality of service interaction", The International Journal of Computer and Telecommunications Networking, vol. 38, No. 2, pp. 137-163, 2002.

Ganz et al., "Q-Soft: software framework for QoS support in home networks", Computer Networks, vol. 42, No. 1, pp. 7-22, 2003.

Kent et al., "Security Architecture for the Internet Protocol", Network Working Group, Nov. 1998, pp. 1-66.

Lee et al., "Home Network Control Protocol for Networked Home Appliances and Its Application", IEEE, pp. 1-7, 2002.

* cited by examiner

HOME NETWORK SYSTEM

This application claims the benefit of Korean Patent Application No. 2003-0034962, filed on May 30, 2003; Korean Patent Application No. 2004-0022184, filed Mar. 31, 2004 and PCT Application No. PCT/KR2004/001147, filed on May 14, 2004, which are hereby incorporated by reference for all purposes as if fully set forth herein.

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol as a general communication standard.

Yet another object of the present invention is to provide a plurality of united primitives for transmitting data in a living network control protocol.

In order to achieve the above-described objects of the invention, there is provided a home network system including: a network based on a predetermined protocol; at least one electric device connected to the network; and a network manager connected to the network, for controlling and monitoring the electric device, wherein the protocol includes an application layer for handling a message for controlling and/or monitoring the electric device, a network layer for network-connecting the electric device to the network manager, a data link layer for accessing a shared transmission medium, and a physical layer for providing a physical interface between the electric device and the network manager, wherein the physical layer further includes a special protocol for providing an interface with a dependent transmission medium, and the network layer further includes a home code control sub-layer for managing a home code for network security when accessing the dependent transmission medium.

Preferably, the protocol performs an intrinsic function of the electric device or the network manager, and further includes an application software for providing an interface with the application layer.

Preferably, the application software further includes a network management sub-layer for managing a parameter and/or the electric device and/or network manager accessing the network.

Preferably, the special protocol is a power line communication protocol when the dependent transmission medium is a power line.

Preferably, the special protocol is a wireless communication protocol when the dependent transmission medium is wireless.

Preferably, the protocol further includes a parameter management layer for setting, getting or transmitting a parameter used in the application layer, the network layer, the data link layer or the physical layer upon the request of the network management sub-layer.

Preferably, the interface between the physical layer and the data link layer includes at least one of a frame sending primitive, a frame receiving primitive and a line status transmitting primitive.

Preferably, the frame sending primitive and the frame receiving primitive include predetermined bytes of a universal asynchronous receiver and transmitter (UART) frame.

Preferably, the line status transmitting primitive includes a line status such as a busy or idle status.

Preferably, the interface between the data link layer and the network layer includes at least one of a packet sending primitive, a packet receiving primitive and a data link layer completing primitive.

Preferably, the packet sending primitive includes a packet, a length of the packet and service priority.

Preferably, the packet receiving primitive includes a packet and a length of the packet.

Preferably, the data link layer completing primitive includes a packet transmission result.

Preferably, the data link layer completing primitive includes a transmission failure reason according to the packet transmission result.

Preferably, the interface between the network layer and the application layer includes at least one of a request message sending primitive, a message receiving primitive and a network layer completing primitive.

Preferably, the request message sending primitive includes a communication cycle identifier, a request message, a length of the request message, a destination address, a source address, a network layer service, response timeout, a transmission interval between repeated notification messages and service priority.

Preferably, the message receiving primitive includes a communication cycle identifier, an event response message, a length of the event response message, a destination address and a source address.

Preferably, the network layer completing primitive includes a communication cycle identifier and a transmission result.

Preferably, the network layer completing primitive includes a transmission failure reason according to the transmission result.

Preferably, the network layer completing primitive includes a retry number according to the transmission result.

Preferably, the protocol is applied to the network manager and/or electric device performing a master function.

Preferably, the interface between the network layer and the application layer includes at least one of a request message receiving primitive, a response message sending primitive, an event message sending primitive and a network layer completing primitive.

Preferably, the request message receiving primitive includes a request message, a length of the request message, a destination address, a source address, a network layer service and a duplicate packet check result.

Preferably, the response message sending primitive includes a communication cycle identifier, a response message and a length of the response message.

Preferably, the event message sending primitive includes a communication cycle identifier, an event message, a length of the event message, a destination address, a source address, a network layer service, a transmission interval between repeated notification messages and service priority.

Preferably, the network layer completing primitive includes a communication cycle identifier and a transmission result.

Preferably, the network layer completing primitive includes a transmission failure reason according to the transmission result.

Preferably, the network layer completing primitive includes a retry number according to the transmission result.

Preferably, the protocol is applied to the electric device performing a slave function.

Preferably, the interface between the application layer and the application software includes at least one of a user request primitive, a user download request primitive, a user upload request primitive, a user response primitive, a user event receiving primitive and an application layer completing primitive.

Preferably, the user request primitive includes an application service code, a request message, a length of the request message, a destination address, an application layer service, timeout and service priority.

Preferably, the user download request primitive includes an application service code, a download file, an application layer service, a destination address, timeout and service priority.

Preferably, the user upload request primitive includes an application service code, an upload file, an application layer service, a destination address, timeout and service priority.

Preferably, the user response primitive includes an application service code, a response message, a length of the response message and a source address.

Preferably, the user event receiving primitive includes an event message, a length of the event message and a source address.

Preferably, the application layer completing primitive includes an application service code and a service result.

Preferably, the application layer completing primitive includes a failure reason according to the service result.

Preferably, the protocol is applied to the network manager and/or electric device performing a master function.

Preferably, the interface between the application layer and the application software includes at least one of a user request receiving primitive, a user response sending primitive and a user event sending primitive.

Preferably, the user request receiving primitive includes an application service code, a request data, a length of the request data and a source address.

Preferably, the user response sending primitive includes an application service code, a response data and a length of the response data.

Preferably, the user event sending primitive includes an application service code, an application service, an event code and a status variable value.

Preferably, the protocol is applied to the electric device performing a slave function.

Preferably, the parameter of the physical layer includes a communication speed.

Preferably, the parameter of the data link layer includes at least one of frame timeout, a maximum frame allowable interval time, a minimum packet allowable interval time, a backoff retry number, a maximum transmission allowable time, a busy check time and a transmission delay time.

Preferably, the parameter of the network layer includes at least one of a product code, a node address, a cluster code, a home code, a maximum retry number, transmission timeout, a response delay time, a transmission delay time and a duplicate packet elapsed time.

Preferably, the parameter of the application layer includes at least one of a transmission interval between address request messages, a transmission interval between active event messages, a buffer size, service timeout and a transmission interval between download messages.

Preferably, the network management sub-layer interfaces with the parameter management layer through at least one of a parameter setting primitive and a parameter getting primitive in order to set or get at least one of the parameters of the physical layer, the data link layer, the network layer and the application layer.

Preferably, the parameter management layer interfaces with the physical layer, the data link layer, the network layer or the application layer through at least one of a parameter setting primitive, a parameter getting primitive and a parameter transmitting primitive in order to set, get or transmit at least one of the parameters of the physical layer, the data link layer, the network layer and the application layer.

BEST MODE FOR CARRYING OUT THE INVENTION

A home network system in accordance with the present invention will now be described in detail with reference to the accompanying drawings.

Figure 1:
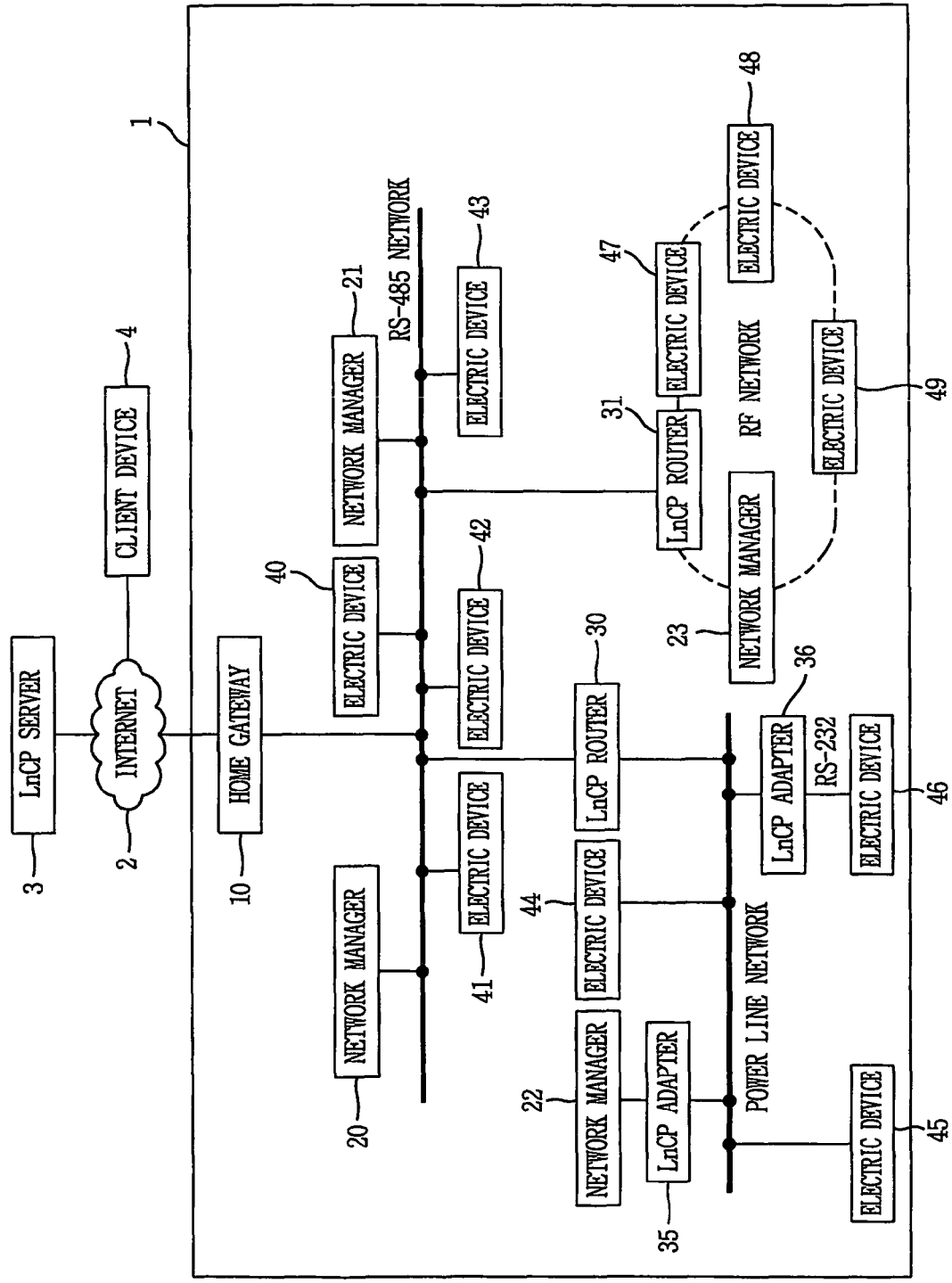
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
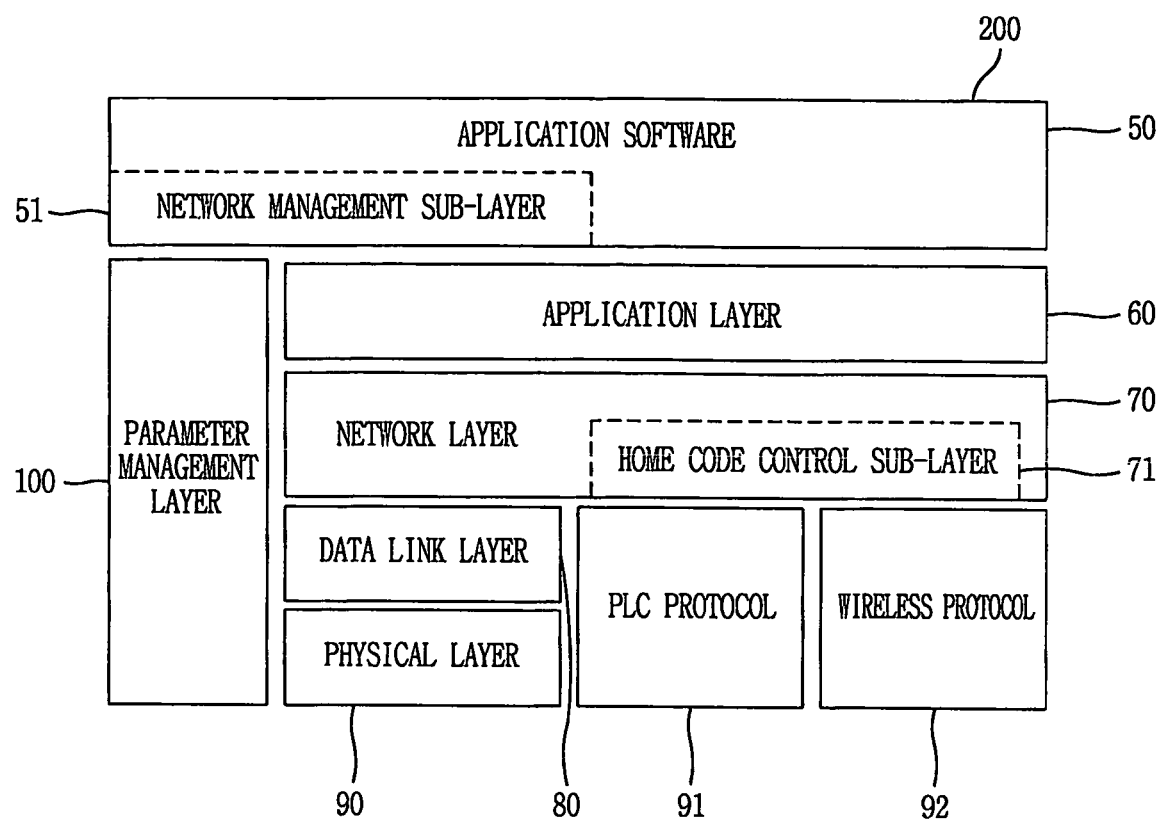
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3A:
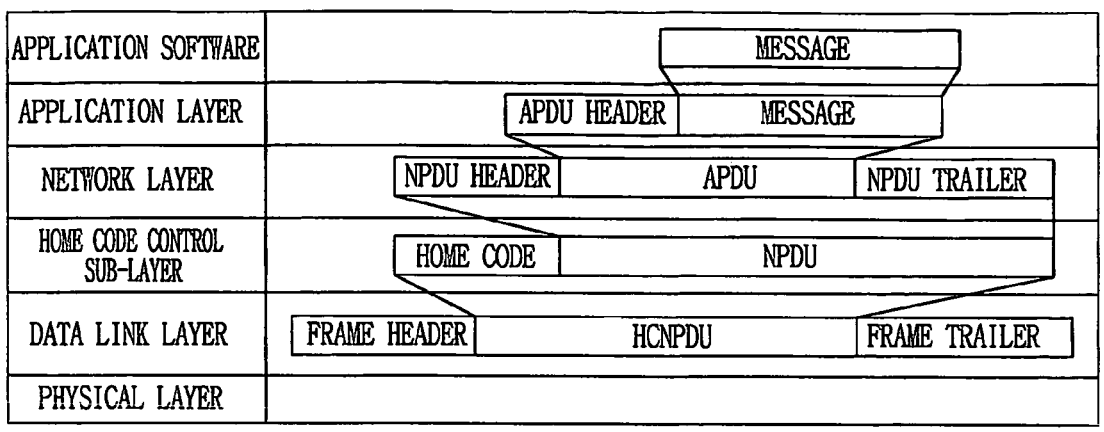
FIGS. 3A and 3B are structure views illustrating interfaces between layers of FIG. 2, respectively.
Figure 3B:
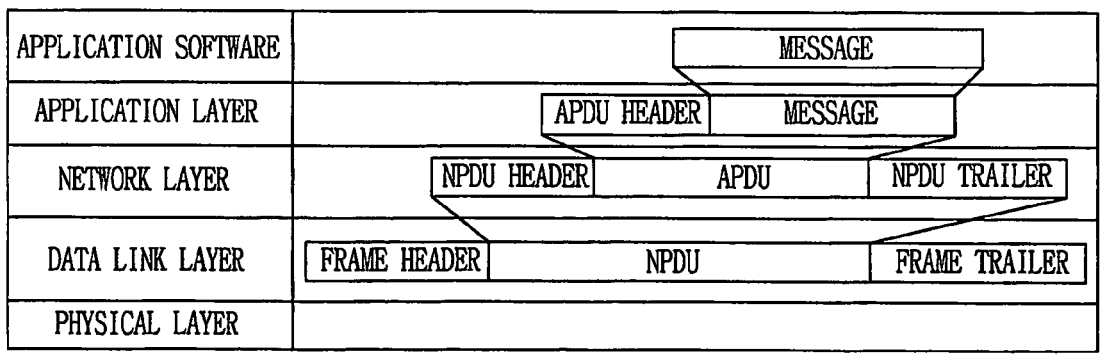

FIGS. 3A and 3B are structure views illustrating interfaces between the layers of FIG. 2, respectively.

FIG. 3A illustrates the interfaces between the layers when the physical layer 90 is connected to the dependent transmission medium, and FIG. 3B illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3A and 3B, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 4A to 4F are detailed structure views illustrating the interfaces of FIGS. 3A and 3B, respectively.

Figure 4A:
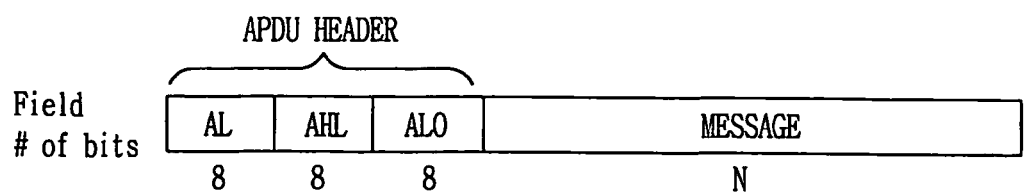
FIGS. 4A to 4F are detailed structure views illustrating the interfaces of FIGS. 3A and 3Bb, respectively.

FIG. 4A illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 4B:
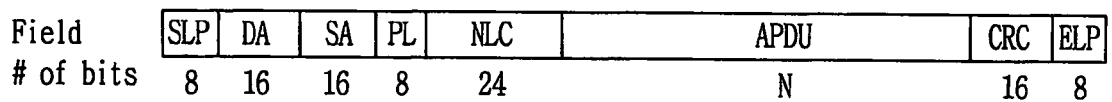
Figure 4C:
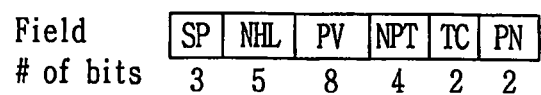

FIG. 4B illustrates the NPDU structure in the network layer 70, and FIG. 4C illustrates a detailed NLC structure of the NPDU.

A start of LnCP packet (SLP) field shows start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind.

A packet length (PL) field shows the whole length of the NPDU, and has a minimum value of 12 bytes and a maximum value of 100 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Application layer |
|---|---|---|
| High | 0 | When an urgent message is transmitted |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), normally has 9 bytes, and is extensible maximally to 16 bytes.

A protocol version (PV) field is an one-byte field showing a version of a used protocol. The upper 4 bits include a version field and the lower 4 bits include a sub-version field. The version and the sub-version are represented by the hexadecimal, respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
|---|---|
| Request packet | 0 |
| Not used | 1~3 |

TABLE 3-continued

| Explanation | Value |
| --- | --- |
| Response packet | 4 |
| Not used | 5~7 |
| Notification packet | 8 |
| Not used | 9~12 |
| Reserved value for interface with the home code control sub-layer | 13~15 |

A transmission counter (TC) field is a 2-bit field for retrying a request packet when the request packet or response packet is not successfully transmitted due to a communication error in the network layer 70, or repeatedly transmitting a notification packet to improve a transmission success ratio. A receiver can check a duplicate message by using a value of the TC field. Table 4 shows the range of the values of the TC field by the NPT values.

TABLE 4

| Kind of packet | Value (range) |
| --- | --- |
| Request packet | 1~3 |
| Response packet | 1 |
| Notification packet | 1~3 |

A packet number (PN) field has 2 bits, and is used to check a duplicate packet in a slave device with the TC field and process a plurality of communication cycles in a master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field shows end of a packet and has a value of 0x03. Although a data corresponding to the length of the PL field is received, if the ELP field is not checked, it is deemed to be a packet error.

Figure 4D:

FIG. 4D illustrates the HCNPDU structure in the home code control sub-layer 71.

As depicted in FIG. 4D, a home code (HC) field is added to the upper portion of the NPDU.

The home code is comprised of 4 bytes, and has a unique value within the line distance where a packet can be transmitted.

Figure 4E:
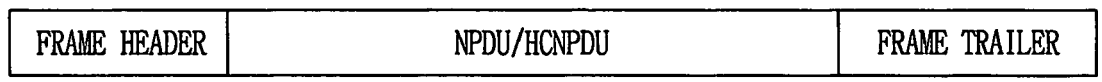

FIG. 4E illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 4F:
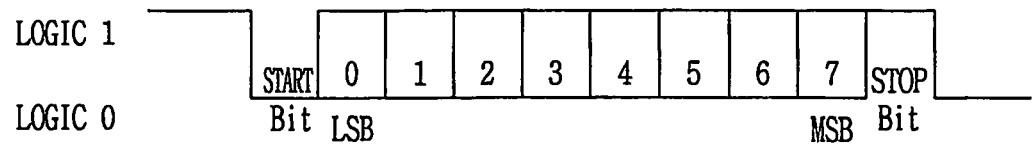

FIG. 4F illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 4f, and transmitted through the transmission medium. The UART frame includes one bit of start bit, 8 bits of data and one bit of stop bit, and does not use a parity bit. The UART frame is transmitted in the order of the start bit to stop bit. When the home network system 1 using the LnCP employs the UART, it does not have additional frame header and frame trailer.

The node parameters used in the aforementioned layers will now be explained.

Data types of the node parameters mentioned below correspond to one of a few data types of Table 6.

TABLE 6

| Notation | Data type | Explanation |
| --- | --- | --- |
| char | signed char | 1 byte when data length is not stated |
| uchar | unsigned char | 1 byte when data length is not stated |
| int | signed int | 2 bytes when data length is not stated |
| uint | unsigned int | 2 bytes when data length is not stated |
| long | signed long | 4 bytes when data length is not stated |
| ulong | unsigned long | 4 bytes when data length is not stated |
| string | string | A character string data where the last byte is NULL |
| FILE | — | A data having a file structure |

First, the application layer 60 generates a message and an APDU by using information or a command transmitted from the user through the application software 50, transmits the message and the APDU to the lower network layer 70, interprets an APDU from the lower network layer 70, and transmits the APDU to the application software 50.

Table 7 shows node parameter values used in the application layer 60.

TABLE 7

| Name | Type | Explanation |
| --- | --- | --- |
| Transmission interval between address request messages | constant uint AddressReqInt | A logical address value is received from the network layer 70 directly after power on. When the value is 0x00, an address request message is consecutively transmitted at an interval of AddressReqInt seconds until an address is designated. |
| Transmission interva between active event messages | uint NP_AliveInt | When a logical address of the network layer 70 is not 0x00, an active event message is consecutively transmitted at an Interval of NP_AliveInt seconds in a network connection status. |
| Buffer size | uchar NP_BufferSize | A size of a buffer containing a message (unit is byte number) |
| Service timeout | const uint SvcTimeOut | A time taken for the application layer 60 to receive a request message sending primitive RegMsgSend, 30 seconds |
| Transmission interval between download request messages | const unit DLInterval | A time interval for deciding download service failure when the application layer 60 of a slave device receives a download request message and does not receive subsequent download request message |

Thereafter, the network layer 70 performs the following functions.

First, the network layer 70 performs an address management function, namely stores its address and an address of the destination network manager 20 to 23 or the destination electric device 40 to 49. Here, the network layer 70 can designate a cluster address by using information and location information of the network manager 20 to 23 or the electric device 40 to 49 included in the address, and support multicasting and broadcasting communication.

Second, the network layer 70 performs a flow control function, namely manages a communication cycle and controls flow of a packet.

Third, the network layer 70 performs an error control function. That is, when the network layer 70 does not receive a response packet within a set time, the network layer 70 retries a data. A retry number is maximally 3.

Fourth, the network layer 70 performs a transaction control function, namely prevents duplicate transaction of the same message by checking a duplicate packet, and controls simultaneous communication cycles.

Fifth, the network layer 70 performs a routing control function, namely transmits a packet between at least two independent transmission media, and controls flow of a packet to prevent an infinite loop between the LnCP routers 30 and 31 and the LnCP adapters 35 and 36.

The network layer 70 provides services in communication cycle units. The communication cycles are classified into {1-Request, 1-Response}, {1-Request, Multi-Responses}, {1-Notification} and {Repeated-Notification}.

In the {1-Request, 1-Response} communication cycle, one master device transmits one request packet to one slave device, and the slave device transmits one response packet to the master device as a response.

In the {1-Request, Multi-Responses} communication cycle, one master device transmits one request packet to a plurality of slave devices, and each of the slave devices sequentially transmits a response packet to the request packet.

In the {1-Notification} communication cycle, a (master or slave) device transmits one notification packet to one or a plurality of (master or slave) devices, and directly ends communication.

In the {Repeated-Notification} communication cycle, in order to obtain transmission reliability of the {1-Notification} communication cycle, the same packet is repeatedly transmitted and communication is ended.

Table 8a shows relations among the aforementioned communication cycles, packet types and transmission services (or network layer services).

TABLE 8a

| Communication cycle | Packet type | NL service |
| --- | --- | --- |
| {1-Request, 1-Response} | Request packet-Response packet | Acknowledged(0) |
| {1-Request, Multi-Responses} | Request packet-Response packet | Acknowledged(0) |
| {1-Notification} | Notification packet | Non-Acknowledged(1) |
| {Repeated-Notification} | Notification packet | Repeated-Notification(2) |

Table 8b shows node parameter values used in the network layer 70.

TABLE 8b

| Name | Type | Explanation |
|---|---|---|
| Product code | uchar ProductCode | A code for combining individual functions of products |
| Logical address | uchar NP_LogicalAddress | An one-byte address for distinguishing a plurality of products having the same product code |
| Cluster code | uchar NP_ClusterCode | An one-byte address for distinguishing clusters of a device |
| Home code | ulong NP_HomeCode | A 4-byte value for defining a home code of a device |
| Maximum retry number | constant uchar SendRetries | In an acknowledged service, a maximum retry number of a request packet, or in a repeated-notification service, a retry number |
| Transmission timeout | constant uint SendTimeOut | A time (ms) taken for the network layer 70 to transmit an NPDU to the data link layer 80 and receive DLLCompleted primitive, 1000 ms |
| Response delay time | uint ResDelayTime | When an acknowledged transmission service is performed on a group address, a time (ms) delayed by a slave device receiving a request packet before transmitting a response packet, random value within the range of 0~5000 ms |
| Maximum repeater delay time | constant uint RepeaterDelayTime | When the network is normally operated, a maximum time (ms) allowed until a normal packet from a sender is received by a receiver, 5000 ms |
| Duplicate packet elapsed time | constant uint DupElapsedTime | When a slave device consecutively receives request packets from the same master device, a minimum interval time (ms) between the request packets for guaranteeing individuality of each packet, 10000 ms |

The data link layer 80 prescribes a medium access control (MAC) function of accessing a shared transmission medium. When using a non-standardized transmission medium such as RS-485, the data link layer 80 employs probabilistic-delayed carrier sense multiple access (p-DCSMA) as a medium access control protocol, and when using a standardized transmission medium such as a power line or IEEE 802.11, the data link layer 80 is prescribed by the corresponding protocol.

Table 9 shows node parameter values used in the data link layer 80 using the UART frame. The time of each parameter is set in the presumption that a transmission rate of the physical layer 90 is 4800 bps. Here, one information unit time (IUT) is calculated as 2.1 ms.

TABLE 9

| Name | Type | Explanation |
|---|---|---|
| Frame allowable interval time | constant uchar FrameTimeOut | A maximum allowable interval time between UART frames in packet reception, 2 IUT |
| Maximum frame allowable interval time | constant uchar MaxFrameInterval | A maximum allowable interval time between UART frames in packet transmission, 1 IUT |
| Minimum packet allowable interval time | uint MinPktinterval | A minimum allowable interval time between packets transmitted on a medium in packet transmission, over 5 IUT. A time for transmitting a packet received by the data link layer 80 to the application layer 60 and finishing packet processing must be smaller than this value. |
| Backoff retry number | constant uchar BackOffRetries | A maximum retry number of a MAC algorithm in competition failure or conflict of transmission data, 10 times |
| Maximum transmission allowable time | constant uint MACExecTime | An allowable execution time (ms) of a MAC algorithm, 1000 ms |
| Busy check time | constant uchar BusyCheckTime | A time for sensing a medium status (busy or idle), 3 IUT |
| Transmission delay time | uint RandomDealyTime | A standby time for transmission when a medium is in an idle status, random value within a competitive window Wc range selected by SvcPriority value |

Table 10 shows node parameter values used in the physical layer 90.

TABLE 10

| Name | Type | Explanation |
|---|---|---|
| Communication speed | Unit NP_bps | A communication speed of UART, initial value is 4800 bps. |

Figure 5A:
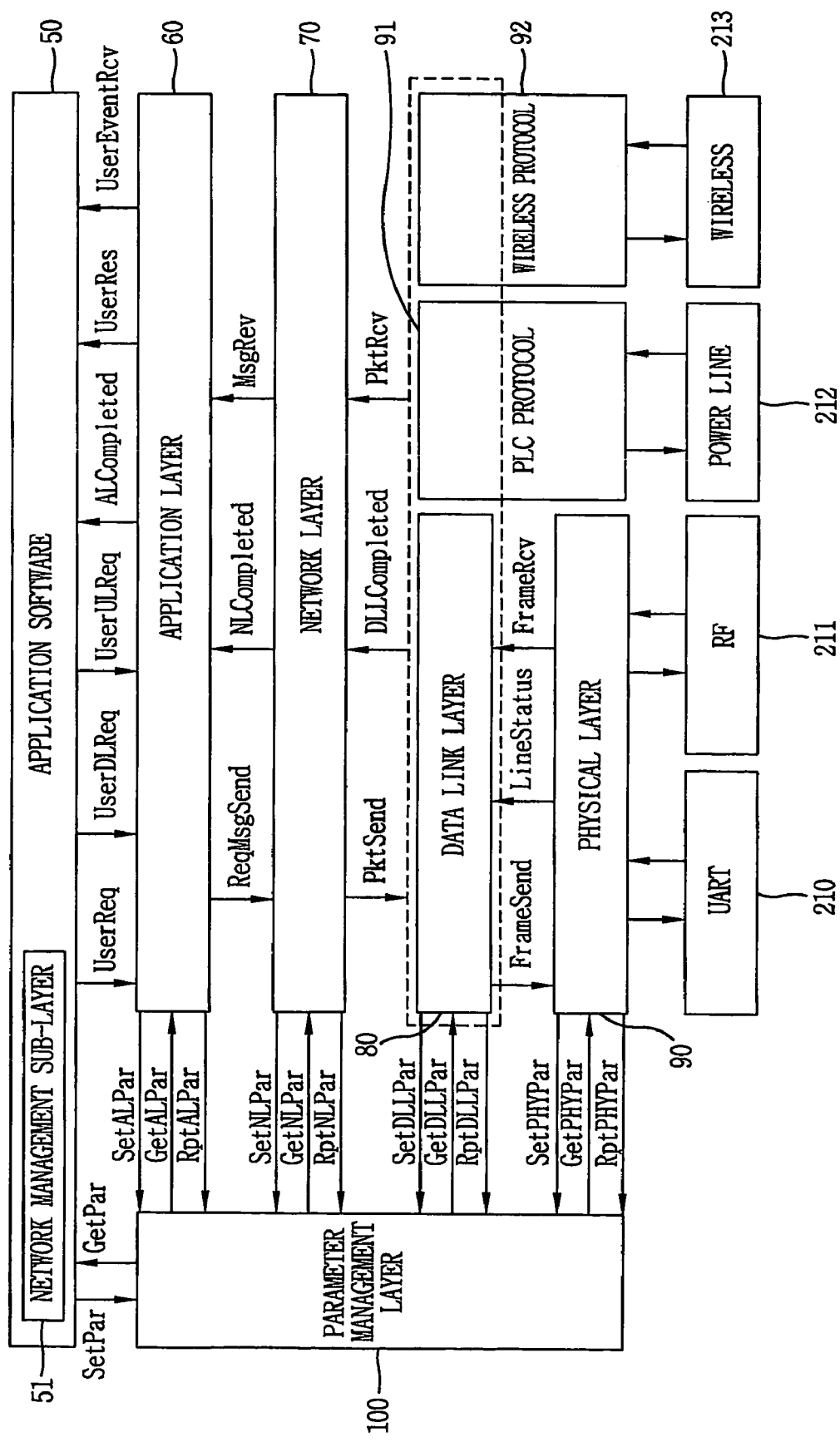
FIGS. 5A and 5B are structure views illustrating primitives for transmitting data exchanged between the layers.
Figure 5B:
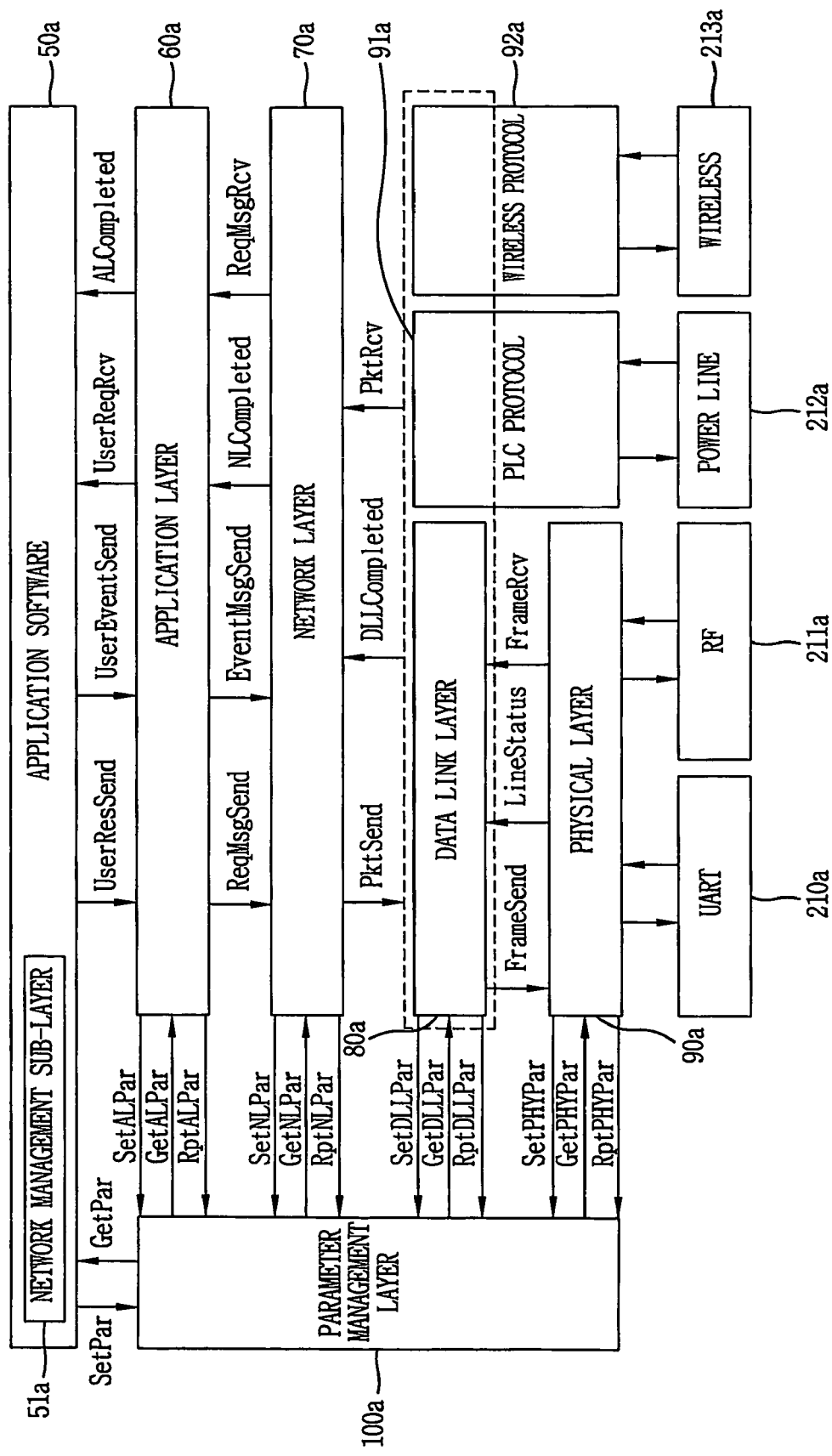

FIGS. 5A and 5B are structure views illustrating primitives for transmitting data exchanged between the layers.

FIG. 5A illustrates transmission of the primitives between the layers of the master device.

As shown in FIG. 5A, the primitives between the application software 50 and the application layer 60 include UserReq, UserDLReq, UserULReq, ALCompleted, UserRes and UserEventRcv.

The user request primitive UserReq is a service request primitive formed by a single communication cycle from the application software 50 of the master device, and used for controlling or monitoring. The user request primitive UserReq includes constitutional elements of Table 11a.

TABLE 11a

| Name | Type | Explanation |
| --- | --- | --- |
| Application service code | ulong ALSvcCode | An application service code of the application layer 60, combination of a product code and a command code |
| Request message | RequestMessage *ReqMsg | A request message including a command code and input arguments |
| Length of request message | uchar ReqMsgLength | A byte data length of a request message |
| Designation address | uint DstAddress | An address of a receiver device |
| Network layer service | uchar NLService | Transmission service types in the network layer 70<br>0: Request-response-message<br>1: Request-message-only<br>2: Repeated-message<br>3: Event-message-only |
| Timeout | uint TimeOut | When an AL service is Request-response-message, a time (ms) taken for a master device to transmit a request packet and receive a response packet, or when the AL service is Repeated-message, a time interval (ms) between consecutive messages |
| Service priority | uchar SvcPriority | Transmission priority in the data link layer 80 |

In an application layer service (AL service), Request-response-message is combination of a request message and a response message. Here, the master device transmits the request message, and the slave device receiving the request message always transmits the response message. In Request-message-only, only a request message is provided. Here, the slave device receiving the request message does not transmit a response message. In Repeated-message, only a request message or only an event message is consecutively provided. Here, the slave device does not transmit a response message. In Event-message-only, only an event message is provided. Here, the slave device does not transmit a response message.

The user download request primitive UserDLReq is a download service request primitive transmitted from the application software 50 of the master device, and includes constitutional elements of Table 11b.

TABLE 11b

| Name | Type | Explanation |
| --- | --- | --- |
| Application service code | ulong ALSvcCode | An application service code of the application layer 60, combination of a product code and a command code |
| Download file | FILE *DownloadFile | A file having download data |
| Application layer service | uchar ALService=0 | A transmission service type fixed to Request-response-message(0) |
| Destination address | uint DstAddress | An address of a receiver device |
| Timeout | uint TimeOut | A time (ms) taken for a master device to transmit a request packet and receive a response packet |
| Service priority | uchar SvcPriority | Transmission priority in the data link layer 80 fixed to 1 |

The user upload request primitive UserULReq is an upload service request primitive transmitted from the application software 50 of the master device, and includes constitutional elements of Table 11c.

TABLE 11c

| Name | Type | Explanation |
| --- | --- | --- |
| Application service code | ulong ALSvcCode | An application service code of the application layer 60, combination of a product code and a command code |
| Upload file | FILE *UploadFile | A file name for storing upload data |
| Application layer service | uchar ALService | A transmission service type fixed to Request-response-message(0) |
| Destination address | uint DstAddress | Address of a receiver device |

TABLE 11c-continued

| Name | Type | Explanation |
|------|------|-------------|
| Timeout | uint TimeOut | A time (ms) taken for a master device to transmit a request packet and receive a response packet |
| Service priority | uchar SvcPriority | Transmission priority in the data link layer 80 fixed to 1 |

The user response primitive UserRes is a primitive for transmitting a service execution result of the master device to the application software 50, and includes constitutional elements of Table 11d.

TABLE 11d

| Name | Type | Explanation |
|------|------|-------------|
| Application service code | ulong ALSvcCode | An application service code of the application layer 60, combination of a product code and a command code |
| Response message | ResponseMessage *ResMsg | A response message having a command code and return arguments |
| Length of response message | uchar ResMsgLength | A byte data length of a response message |
| Source address | uint SrcAddress | An address of a sender device |

The user event receiving primitive UserEventRcv is an event service primitive transmitted to the application software 50 of the master device, and includes constitutional elements of Table 11e.

TABLE 11e

| Name | Type | Explanation |
|------|------|-------------|
| Application service code | ALSvcCode | An application service code of the application layer 60, combination of a product code, a command code and an event code |
| Event message | EventMesage *EventMsg | An event message from a slave device |

TABLE 11e-continued

| Name | Type | Explanation |
|------|------|-------------|
| Length of event message | uchar EventMsgLength | A byte data length of a response message |
| Source address | uint SrcAddress | An address of a sender device |

The application layer completing primitive ALCompleted is a primitive for transmitting an execution result of the application layer 60 of the master device to the application software 50, and includes constitutional elements of Table 11f.

TABLE 11f

| Name | Type | Explanation |
|------|------|-------------|
| Application service code | ulong ALSvcCode | An application service code of the application layer 60, combination of a product code and a command code |
| Service result | uchar ALResult | If a service requested by the user has been successfully finished, SERVICE_OK(1), and if not, SERVICE_FAILED(0) |
| Failure reason code | uchar ALFailCode | When ALResult is SERVICE_FAILED, a value for classifying failure reasons |

Still referring to FIG. 5A, the primitives between the application layer 60 and the network layer 70 include ReqMsgSend, NLCompleted and MsgRcv.

The request message sending primitive ReqMsgSend is a primitive for transmitting a message from the application layer 60 of the master device to the network layer 70, and includes constitutional elements of Table 12a.

TABLE 12a

| Name | Type | Explanation |
|------|------|-------------|
| Communication cycle identifier | ulong CycleID | An ID number of a communication cycle in a master device |
| Request message | uchar *ReqAPDU | An APDU including a request message generated in the application layer 60 of a master device |
| Length of request message | uchar APDULength | A byte data length of an APDU |
| Destination address | uint DstAddress | An address of a receiver device |
| Source address | uint SrcAddress | An address of a sender device |
| Network layer service | uchar NLService | Communication cycle service types of a master device 0: Acknowledged, 1: Non-acknowledged 2: Repeated-notification |
| Response timeout | uchar responseTimeOut | When an NL service is selected as Acknowledged, a time (ms) taken for a master device to transmit a request packet and receive a response packet |
| Transmission interval between repeated notification packets | uint RepNotiInt | When an NL service is selected as Repeated-notification, a time interval (ms) between consecutive notification packets |
| Service priority | uchar SvcPriority | Transmission priority of a request message |

Here, the communication cycle identifier CycleID is generated by combining the application service code ALSvcCode and the node address of the receiver device.

The message receiving primitive MsgRcv is a primitive for transmitting a packet from the network layer 70 of the master device to the application layer 60, and includes constitutional elements of Table 12b.

TABLE 12b

| Name | Type | Explanation |
| --- | --- | --- |
| Communication cycle identifier | ulong CycleID | An ID number of a communication cycle in a master device |
| Event response message | uchar *ResEventAPDU | An APDU transmitted to the application layer 60 |
| Length of event response message | uchar APDULength | A byte data length of an APDU |
| Destination address | uint DstAddress | An address of a receiver device |
| Source address | uint SrcAddress | An address of a sender device |

The structure of the communication cycle identifier CycleID will later be explained.

The network layer completing primitive NLCompleted is a primitive for notifying a packet processing status from the network layer 70 to the application layer 60, and includes constitutional elements of Table 12c.

TABLE 12c

| Name | Type | Explanation |
| --- | --- | --- |
| Communication cycle identifier | ulong CycleID | An ID number of a communication cycle in a master device |
| transmission result | uchar NLResult | If a communication cycle has been successfully finished, CYCLE_OK(1), and if not, CYCLE_FAILED(0) |
| Failure reason code | uchar NLFailCode | When NLResult is CYCLE_FAILED, a value for classifying failure reasons |
| Retry number | uchar NLSuccessCode | When NLResult is CYCLE_OK, a retry number |

As shown in FIG. 5A, the primitives between the network layer 70 and the data link layer 80 include PktSend, PktRcv and DLLCompleted.

The packet sending primitive PktSend is a primitive for transmitting a packet from the network layer 70 to the data link layer 80, and includes constitutional elements of Table 13a.

TABLE 13a

| Name | Type | Explanation |
| --- | --- | --- |
| Packet | uchar *NPDU/HCNPDU | A packet of the network layer 70 |
| Length of packet | uchar NPDULength | A byte data length of an NPDU/HCNPDU |
| Service priority | uchar SvcPriority | Transmission priority |

The packet receiving primitive PktRcv is a primitive for transmitting a packet from the data link layer 80 to the network layer 70, and includes constitutional elements of Table 13b.

TABLE 13b

| Name | Type | Explanation |
| --- | --- | --- |
| Packet | uchar *PDU | A packet of the network layer 70 |
| Length of packet | uchar PDULength | A byte data length of a PDU |

The data link layer completing primitive DLLCompleted is a primitive for notifying a packet transmission result from the data link layer 80 to the network layer 70, and includes constitutional elements of Table 13c.

TABLE 13c

| Name | Type | Explanation |
| --- | --- | --- |
| Packet transmission result | uchar DLLResult | A packet transmission result: If a packet transmission process has been successfully finished, SEND_OK(1), and if not, SEND_FAILED(0) |
| Transmission failure reason | uchar DLLFailCode | When DLLResult is SEND_FAILED(0), a value for classifying failure reasons |

At last, the primitives between the data link layer 80 and the physical layer 90 include FrameSend, FrameRcv and RptLineStatus.

The frame sending primitive FrameSend is a primitive for transmitting an one-byte data from the data link layer 80 to the physical layer 90, and includes constitutional elements of Table 14a.

TABLE 14a

| Name | Type | Explanation |
| --- | --- | --- |
| Byte | UART_byte | One-byte data |

The frame receiving primitive FrameRcv is a primitive for transmitting an one-byte data from the physical layer 90 to the data link layer 80, and includes constitutional elements of Table 14a.

The line status transmitting primitive RptLineStatus is a primitive for notifying a line status to the data link layer 80, and includes constitutional elements of Table 14b.

TABLE 14b

| Name | Type | Explanation |
| --- | --- | --- |
| Line status | uchar LineStatus | In a busy status where an UART frame exists on a line, LINE_BUSY is transmitted, and in an idle status, LINE_IDLE is transmitted. |

FIG. 5B illustrates transmission of the primitives between the layers of the slave device.

First, the primitives between the application software 50a and the application layer 60a include UserReqRcv, UserResSend and UserEventSend.

The user request receiving primitive UserReqRcv is a primitive for transmitting a request message (including download and upload) from the master device to the application software 50*a* of the slave device, and includes constitutional elements of Table 15a.

TABLE 15a

| Name | Type | Explanation |
|---|---|---|
| Application service code | ulong ALSvcCode | A service code of the application layer 60a, combination of a product code and a command code |
| Request data | uchar *ReqData | A data included in a request message from a master device |
| Length of request data | uchar ReqDataLength | A length (byte) of a request data |
| Source address | uint SrcAddress | Address of a sender device |

The user response sending primitive UserResSend is a primitive for transmitting a response message to a request message of the master device to the application layer 60*a* of the slave device, and includes constitutional elements of Table 15b.

TABLE 15b

| Name | Type | Explanation |
|---|---|---|
| Application service code | ulong ALSvcCode | A service code of the application layer 60a, combination of a product code and a command code |
| Response data | uchar *ResData | A data included in a response message transmitted to a master device |
| Length of response data | uchar ResDataLength | A byte length of ResData |

The user event sending primitive UserEventSend is a primitive for transmitting to the application layer 60*a* a status variable value of an event message of the slave device intended to be transmitted to the master device, and includes constitutional elements of Table 15c.

TABLE 15c

| Name | Type | Explanation |
|---|---|---|
| Application service code | uchar ALSvcCode | A service code of the application layer 60a, combination of a product code, a command code and an event code |
| Application layer service | uchar ALService | Transmission service types 2: Repeated-message, 3. Event-message-only |

TABLE 15c-continued

| Name | Type | Explanation |
|---|---|---|
| Event code | uint EventCode | An event code |
| Status variable value | uchar *StateValue | A status variable value of an event message |

Still referring to FIG. 5B, the primitives between the application layer 60*a* and the network layer 70*a* include ReqMsgRcv, ResMsgSend, EventMsgSend and NLCompleted.

The request message receiving primitive ReqMsgRcv is a primitive for transmitting a received request message from the network layer 70*a* to the application layer 60*a*, and includes constitutional elements of Table 16a.

TABLE 16a

| Name | Type | Explanation |
|---|---|---|
| Request message | uchar *ReqAPDU | An APDU transmitted to the application layer 60a |
| Length of request message | uchar APDULength | A byte data length of an APDU |
| Destination address | uint DstAddress | An address of a receiver device |
| Source address | uint SrcAddress | An address of a sender device |
| Network layer service | uchar NLService | Communication cycle service types of a slave device 0: Acknowledged, 1: Non-acknowledged |
| Duplicate packet check result | uchar DuplicateCheck | If a duplicate packet check result is normal, NORMAL_PKT(1), and if a duplicate packet is checked, DUPLICATED_PKT(0) |

The response message sending primitive ResMsgSend is a primitive for transmitting a response message from the application layer 60*a* to the network layer 70*a*, and includes constitutional elements of Table 16b.

TABLE 16b

| Name | Type | Explanation |
|---|---|---|
| Communication cycle identifier | ulong CycleID | An ID number of a communication cycle in a slave device |
| Response message | uchar *ResAPDU | An APDU including a response message generated in the application layer 60 of a slave device |
| Length of response message | uchar APDULength | A byte data length of an APDU |

The event message sending primitive EventMsgSend is a primitive for transmitting an event message from the application layer 60*a* to the network layer 70*a*, and includes constitutional elements of Table 16c.

TABLE 16c

| Name | Type | Explanation |
|---|---|---|
| Communication cycle identifier | ulong CycleID | An ID number of a communication cycle in a slave device |
| Event message | uchar *EventAPDU | An APDU including an event message generated in the application layer 60 of a slave device |
| Length of event message | uchar APDULength | A byte data length of an APDU |
| Destination address | uint DstAddress | Address of a receiver device |
| Source address | uint SrcAddress | Address of a sender device |
| Network layer service | uchar NLService | Transmission services in the network layer 70a 1: Non-acknowledged, 2: Repeated-notification |

TABLE 16c-continued

| Name | Type | Explanation |
|---|---|---|
| Transmission interval between repeated notification messages | uchar RepNotiInt | When an NL service is selected as Repeated-notification, a time interval (ms) between consecutive notification packets |
| Service priority | uchar SvcPriority | Transmission priority of an event message |

The network layer completing primitive NLCompleted is a primitive for notifying a packet processing status from the network layer 70a to the application layer 60a, and includes constitutional elements of Table 16d.

TABLE 16d

| Name | Type | Explanation |
|---|---|---|
| Communication cycle identifier | ulong CycleID | An ID number of a communication cycle in a slave device |
| Transmission result | uchar NLResult | If a communication cycle has been successfully finished, CYCLE_OK(1), and if not, CYCLE_FAILED(0) |
| Failure reason code | uchar NLFailCode | When NLResult is CYCLE_FAILED, a value for classifying failure reasons |
| Retry number | uchar NLSuccessCode | When NLResult is CYCLE_OK, a retry number |

Thereafter, the primitives between the network layer 70a and the data link layer 80a of the slave device and the primitives between the data link layer 80a and the physical layer 90a of the slave device are used in the same manner as the primitives of the master device of FIG. 5A.

The network management sub-layers 51 and 51a perform a parameter management function of setting parameters in each device, and a function of composing a network, setting an environment and managing an operation of the network.

When the network management sub-layers 51 and 51a receive a request from the application softwares 50 and 50a and the master device, the network management sub-layers 51 and 51a set, read or get parameter values as shown in Table 17a on the corresponding layers through the parameter management layers 100 and 100a.

TABLE 17a

| Layer | Parameter |
|---|---|
| Application layer | AddressReqInt, NP_AliveInt, SvcTimeOut, NP_BufferSize |
| Network layer | NP_LogicalAddress, NP_ClusterCode, NP_HomeCode, SendRetries |
| Data link layer | MinPktInterval |
| Physical layer | NP_bps |

Especially, when the network management sub-layer 51a of the slave device receives the user request receiving primitive UserReqRcv including an application service belonging to 'device node parameter setting service' or 'device node parameter getting service' from the application layer 60a, the network management sub-layer 51a sets or reads the parameter values on the corresponding layers through the parameter management layer 100a, and transmits the result to the application layer 60a through the user response sending primitive UserResSend. Table 17b shows the application services for managing parameters by layers.

TABLE 17b

| Layer | Parameter |
|---|---|
| Application layer | SetOption service, SetAliveTime service, SetClock service, GetBufferSize service |
| Network layer | SetTempAddress service, SetAddress service, GetAddress service |
| Data link layer | No corresponding service |
| Physical layer | SetSpeed |

The network management sub-layers 51 and 51a provide a network management function of composing an LnCP network, setting an environment and managing an operation of the network. The general network management function is operated on the application layer 60, and some of a network information synchronization function between the plurality of network managers 20 to 23 is operated on the application layer 60a of the slave device. As the interface with the application layer 60 of the master device, the user request primitive UserReq, the user download request primitive UserDLReq, the user upload request primitive UserULReq, the user response primitive UserRes, the user event receiving primitive UserEventRcv and the application layer completing primitive ALCompleted are used, and as the interface with the application layer 60a of the slave device, the user request receiving primitive UserReqRcv and the user response sending primitive UserResSend are used.

The parameter management layers 100 and 100a set or read parameters used in each layer upon the request of the network management sub-layers 51 and 51a.

Table 18 shows the parameters used in the parameter management layers 100 and 100a.

TABLE 18

| Name | Type | Explanation |
|---|---|---|
| Parameter timeout | const uint ParTimeOut | A standby time (ms) for transmitting GetALPar(or GetNLPar, GetDLLPar, GetPHYPar) to each layer, and receiving RptALPar(or RptNLPar, RptDLLPar, RptPHYPar) |

The primitives between the parameter management layers 100 and 100a and the network management sub-layers 51 and 51a will now be explained.

Table 19a shows parameter setting primitives SetPar for the interfaces with the network management sub-layers 51 and 51a. Here, the parameter setting primitives SetPar are primitives for transmitting parameter values from the network management sub-layers 51 and 51a to the parameter management layers 100 and 100a.

TABLE 19a

| Name | Type | Explanation |
| --- | --- | --- |
| Destination layer | uchar Destlayer | A layer receiving a parameter value, application layer: 1, network layer: 2, data link layer: 3, physical layer: 4 |
| Layer parameter setting | structure SetLayerPar | Parameters of each layer having different values according to a destination layer value, application layer: SetALPar, network layer: SetNLPar, data link layer: SetDLLPar, physical layer: SetPHYPar |

Table 19b shows parameter getting primitives GetPar for the interfaces with the network management sub-layers 51 and 51a.

TABLE 19b

| Name | Type | Explanation |
| --- | --- | --- |
| Source layer | uchar SrcLayer | A layer transmitting a parameter value, application layer: 1, network layer: 2, data link layer: 3, physical layer: 4 |
| Parameter layer result | uchar PMLResult | If parameter values have been successfully got from each layer, PAR_OK(1), and if not, PAR_FAILED(0) |
| Layer parameter getting | structure GetLayerPar | Parameters of each layer having different values according to SrcLayer value, application layer: RptALPar, network layer: RptNLPar, data link layer: RptDLLPar, physical layer: RptPHYPar |

The primitives between each layer and the parameter management layers 100 and 100a will now be explained.

Parameter setting primitives SetALPar, SetNLPar, SetDLLPar and SetPHYPar for setting predetermined parameter values, parameter getting primitives GetALPar, GetNLPar, GetDLLPar and GetPHYPar for getting predetermined parameter values, and parameter transmitting primitives RptALPar, RptNLPar, RptDLLPar and RptPHYPar for transmitting predetermined parameter values to correspond to the parameter getting primitives GetALPar, GetNLPar, GetDLLPar and GetPHYPar are used between the application layers 60 and 60a, the network layers 70 and 70a, the data link layers 80 and 80a and the physical layers 90 and 90a, and the parameter management layers 100 and 100a.

Here, the parameter setting primitives are primitives for setting node parameter values of each layer, the parameter getting primitives are primitives for enabling the parameter management layers 100 and 100a to read the node parameter values of each layer, and the parameter transmitting primitives are primitives for transmitting the node parameter values upon the request of the parameter management layers 100 and 100a. Table 20 shows the node parameters included in the primitives between each layer and the parameter management layers 100 and 100a.

TABLE 20

| Layer | SetALPar | SetNLPar | SetDLLPar | SetPHYPar |
| --- | --- | --- | --- | --- |
| Node parameter | uint AddressReqInt, uint NP_AliveInt, uint SvcTimeOut, uchar NP_BufferSize. | uchar ProductCode uint NP_LogicalAddress, uint NP_ClusterCode, uint NP_HomeCode, uchar SendRetries. | uint MinPktInterval | uint NP_bps |

A maximum retry number SendRetries in the network layer 70 is used merely in the master device.

At last, the parameter setting primitives SetPar and the parameter getting primitives GetPar for setting and getting the node parameters between the application softwares 50 and 50a and the parameter management layers 100 and 100a are used to set and get the aforementioned node parameters.

When the parameter management layers 100 and 100a receive the parameter setting primitives SetPar from the network management sub-layers 51 and 51a, the parameter management layers 100 and 100a transmit SetALPar, SetNLPar, SetDLLPar or SetPHYPar to the layers stated in the primitives. Each layer must ignore the parameters having the whole bit values of 1 in the received primitives (for example, 0xFF, 0xFFFF, etc).

When the parameter management layers 100 and 100a receive the parameter getting primitives GetPar from the network management sub-layers 51 and 51a, the parameter management layers 100 and 100a transmit GetALPar, GetNLPar, GetDLLPar or GetPHYPar to the layers stated in the primitives.

When the parameter management layers 100 and 100a receive RptALPar, RptNLPar, RptDLLPar or RptPHYPar from each layer, the parameter management layers 100 and 100a set PARResult values included in the GetPar primitives as PAR_OK, and transmit the primitives to the network management sub-layers 51 and 51a. When the parameter management layers 100 and 100a do not receive the primitives from each layer within the parameter timeout ParTimeOut, the parameter management layers 100 and 100a set PARResult values as PAR_FAILED, and transmit the parameters to the network management sub-layers 51 and 51a.

As discussed earlier, the present invention provides the home network system using the control protocol which is the general communication standard for providing the functions of controlling and monitoring the electric devices in the home network system.

In addition, the present invention provides the home network system using the LnCP as the general communication standard.

Furthermore, the present invention provides the plurality of united primitives for transmitting data in the LnCP.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A network electric device for communicating with another network electric device on a network, the network electric device comprising a processor configured for executing at least an application layer, a network layer, a data link layer, a physical layer, an application software, a network management sub-layer, and a parameter management layer, wherein the application layer handles a message for controlling or monitoring the network electric device or the other network electric device, and the application layer communicating with the application software and communicating with the network layer, wherein the application layer transmits a APDU (application protocol data unit) to the network layer;

wherein the network layer performs at least an address management function and a routing control function and the network layer communicating with the data link layer, wherein the network layer transmits a NPDU (network protocol data unit) to the data link layer, wherein the NPDU comprises a start indicating field, a length field, and an end indication field, the start indicating field indicating a start of the NPDU, the length field specifying a length of the NPDU, and the end indication field indicating an end of the NPDU, wherein when a data having a length corresponding to the length field is received by the processor and the end indication field is not received by the processor, the processor considers this as a data error wherein the data link layer accesses a transmission medium, the data link layer communicating with the physical layer, wherein the physical layer provides a physical interface between the network electric device and the other network electric device, wherein the application software performs an intrinsic function of the network electric device, wherein the network management sub-layer transmits a parameter set-primitive to the parameter management layer, the parameter set-primitive including a destination layer field and a parameter field indicating which parameter is to be set, and the destination layer field indicating one of the application layer, the network layer, the data link layer, and the physical layer, and wherein when the parameter management layer receives the parameter set-primitive, the parameter management layer processes the received parameter set-primitive according to the destination field and the parameter field included in the parameter set-primitive.

2. The network electric device of claim 1, wherein the physical layer further comprises a special protocol for providing an interface with a dependent transmission medium, and the network electric device includes a home code control sub-layer for managing a home code for network security when accessing the dependent transmission medium.

3. The network electric device of either claim 1 or 2, wherein the interface between the physical layer and the data link layer comprises a frame sending primitive, a frame receiving primitive and a line status transmitting primitive.

4. The network electric device of either claim 1 or 2, wherein the interface between the data link layer and the network layer comprises a packet sending primitive, a packet receiving primitive and a data link layer completing primitive.

5. The network electric device of either claim 1 or 2, wherein the interface between the network layer and the application layer comprises a request message sending primitive, a message receiving primitive and a network layer completing primitive.

6. The network electric device of either claim 5, wherein the network electric device performs a master function.

7. The network electric device of either claim 1 or 2, wherein the interface between the network layer and the application layer comprises a request message receiving primitive, a response message sending primitive, an event message sending primitive and a network layer completing primitive.

8. The network electric device of claim 7, wherein the network electric device performs a slave function.

9. The network electric device of either claim 1 or 2, wherein the interface between the application layer and the application software comprises a user request primitive, a user download request primitive, a user upload request primitive, a user response primitive, a user event receiving primitive and an application layer completing primitive.

10. The network electric device of claim 9, wherein the network electric device performs a master function.

11. The network electric device of either claim 1 or 2, wherein the interface between the application layer and the application software comprises a user request receiving primitive, a user response sending primitive and a user event sending primitive.

12. The network electric device of claim 11, wherein the network electric device performs a slave function.

13. The network electric device of claim 1, wherein the parameter of the physical layer comprises a communication speed.

14. The network electric device of claim 1, wherein the parameter of the data link layer comprises at least one of frame timeout, a maximum frame allowable interval time, a minimum packet allowable interval time, a backoff retry number, a maximum transmission allowable time, a busy check time and a transmission delay time.

15. The network electric device of claim 1, wherein the parameter of the network layer comprises at least one of a product code, a node address, a cluster code, a home code, a maximum retry number, transmission timeout, a response delay time, a transmission delay time and a duplicate packet elapsed time.

16. The network electric device of claim 1, wherein the parameter of the application layer comprises at least one of a transmission interval between address request messages, a transmission interval between active event messages, a buffer size, service timeout and a transmission interval between download messages.

17. The network electric device of any one of claim 1 or 13 to 16, wherein the network management sub-layer interfaces with the parameter management layer through at least one of the parameter set primitive and a parameter get primitive in order to set or get at least one of the parameters of the physical layer, the data link layer, the network layer and the application layer.

18. The network electric device of claim 17, wherein the parameter management layer interfaces with the physical layer, the data link layer, the network layer or the application layer through at least one of a parameter setting primitive, a parameter getting primitive and a parameter transmitting primitive in order to set, get or transmit at least one of the parameters of the physical layer, the data link layer, the network layer and the application layer.

19. The network electric device of claim 1, wherein when the destination layer field indicates the application layer, the parameter field indicates at least one of a first time interval parameter, a second time interval parameter, a buffer size parameter, and a service timeout parameter, wherein the first time interval parameter specifies a time interval of a address request message, the second time interval parameter specifies a time interval of an active event message informing network status, the buffer size parameter specifies a buffer size of a message, and the service timeout parameter specifies a time for waiting a primitive.

20. The network electric device of claim 1, wherein when the destination layer field indicates network layer, the parameter field indicates at least one of a logical address parameter, a cluster code parameter, a home code parameter, and a retry parameter, wherein the logical address parameter specifies a logical address for distinguishing a plurality of network electric devices having the same product code, the cluster code parameter specifies a cluster code distinguishing cluster of network electric device, the home code parameter specifies a home code of network electric device and the retry parameter specifies a retry number.

21. The network electric device of claim 1, wherein when the destination layer field indicates the data link layer, the parameter field is a third time interval, the third time interval specifying a minimum time interval between packets.

22. The network electric device of claim 1, wherein when the destination layer field indicates the physical layer, the parameter field specifies a communication speed.

* * * * *